Figure 1:
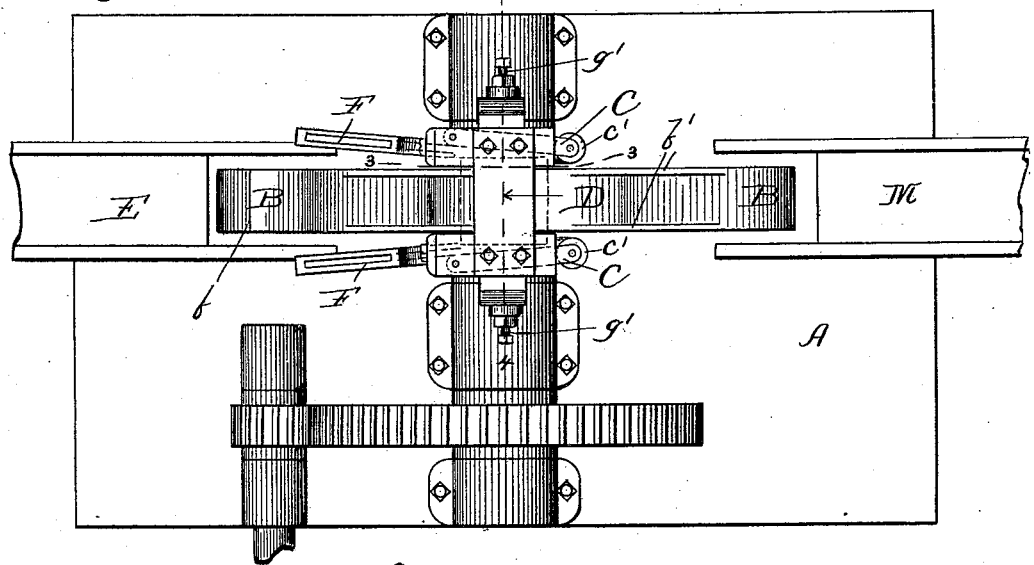

(No Model.)  3 Sheets—Sheet 1.

L. E. CURTIS.
CAN HEADING MACHINE.

No. 479,135. Patented July 19, 1892.

Witnesses:  
H. W. Munday,  
Emma Hack

Inventor:  
Lewis E. Curtis  
By Munday, Evarts & Adcock,  
His Attorneys.

(No Model.) 3 Sheets—Sheet 2.
L. E. CURTIS.
CAN HEADING MACHINE.
No. 479,135. Patented July 19, 1892.
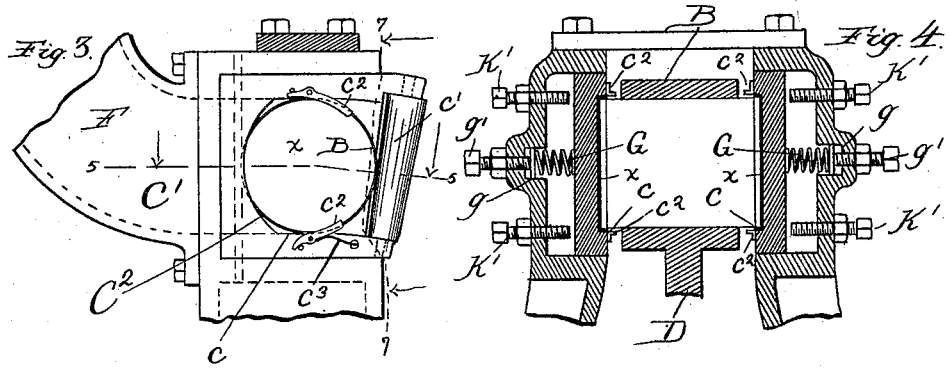
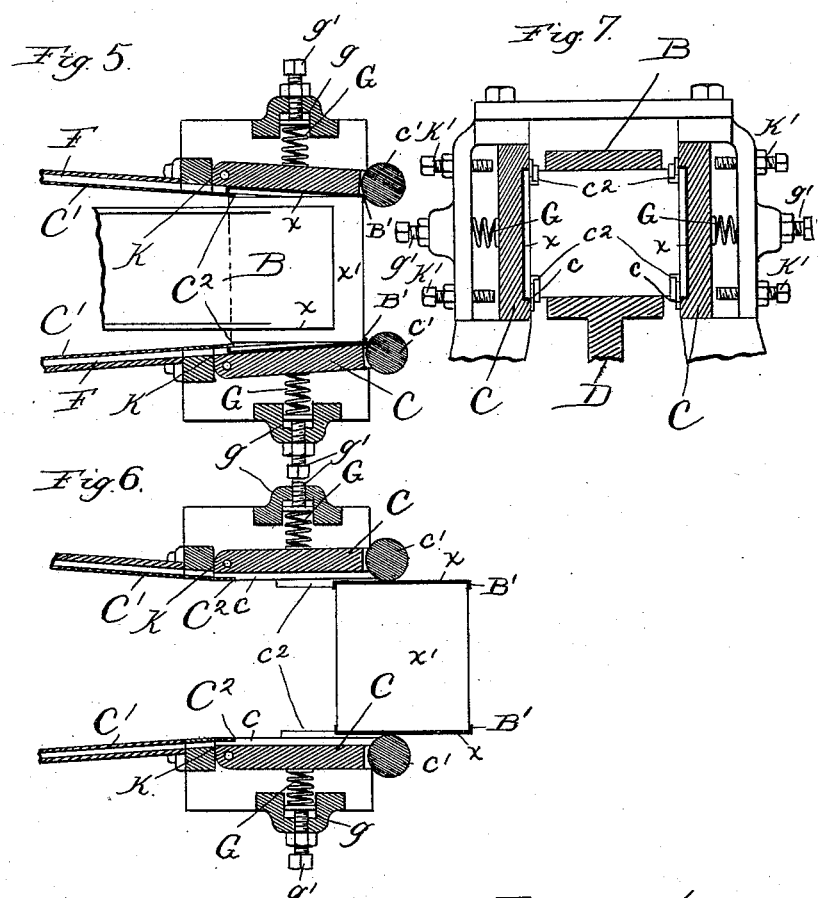
Witnesses:
A. W. Munday.
Emma Hack.
Inventor:
Lewis E. Curtis
By Munday, Evarts & Adcock,
His Attorneys.

(No Model.) 3 Sheets—Sheet 3.
L. E. CURTIS.
CAN HEADING MACHINE.
No. 479,135. Patented July 19, 1892.
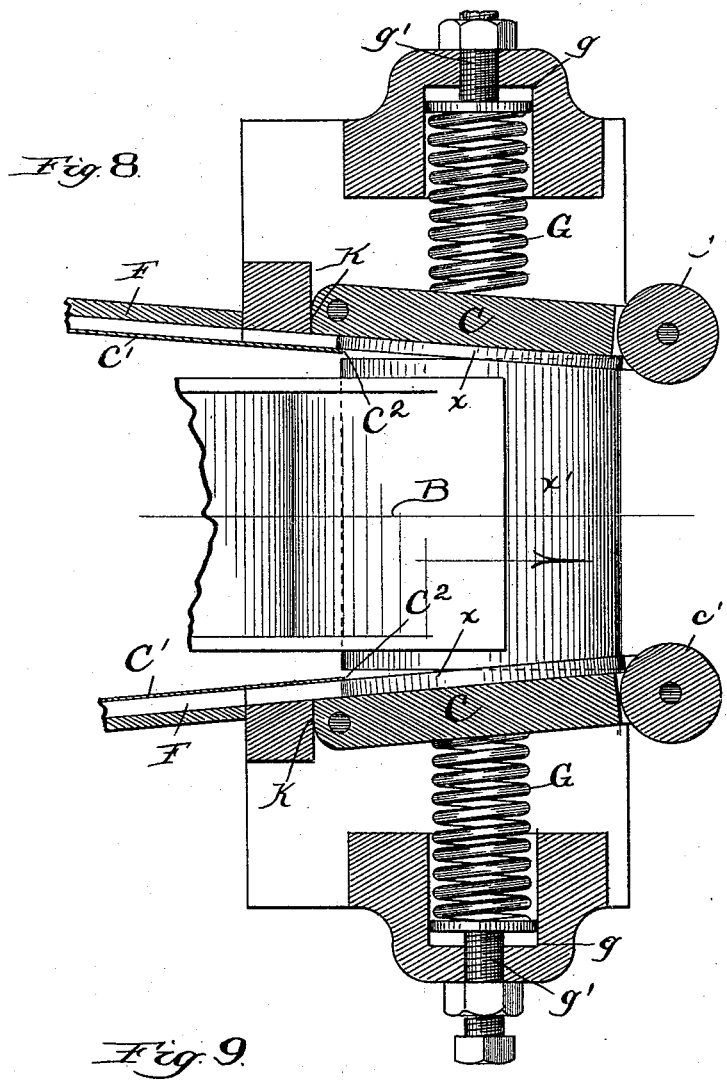
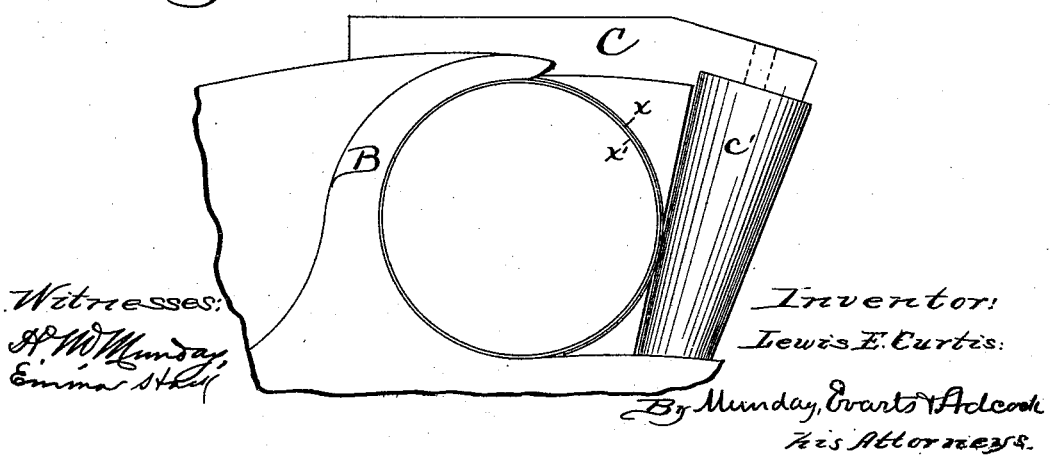
Witnesses:
H. W. Munday,
Emma Shelf
Inventor:
Lewis E. Curtis
By Munday, Evarts & Adcock
his Attorneys

UNITED STATES PATENT OFFICE.

LEWIS E. CURTIS, OF CHICAGO, ASSIGNOR TO EDWIN NORTON, OF MAYWOOD, AND OLIVER W. NORTON, OF CHICAGO, ILLINOIS.

CAN-HEADING MACHINE.

SPECIFICATION forming part of Letters Patent No. 479,135, dated July 19, 1892.

Application filed February 1, 1892. Serial No. 419,862. (No model.)

*To all whom it may concern:*

Be it known that I, LEWIS E. CURTIS, a citizen of the United States, residing in Chicago, in the county of Cook and State of Illinois, have invented a new and useful Improvement in Can-Heading Machines, of which the following is a specification.

My invention relates to machines for automatically applying the heads or ends to can-bodies.

The object of my invention is to provide an efficient machine of a simple and inexpensive construction for automatically applying tight exterior-fitting heads to can-bodies.

In the manufacture of cans for containing fruits, vegetables, fish, and other hermetically-sealed goods the flanged disks constituting the heads or ends of the cans are made to fit tightly upon the cylindrical or body portion of the can, so that the flange of the head may be securely and economically soldered to the can-body, and the heads are made to fit outside the can-body, so that the flange of the head will form a sort of cup to retain the molten solder in the subsequent soldering operation, and also because this in many respects makes a better and stronger can. The machines heretofore in use for applying these tight exterior-fitting heads to can-bodies have been provided with an opening and closing clamp or mold, which encircles the can-body for rounding up and sizing it to conform to the interior diameter of the can-head flange, so that the head and body may be entered the one within the other and forced together. In the present invention a half or part clamp or mold presses against the can-body on one side, while the flange of the can-head serves as the opposing part mold or clamp to size and round the can-body by external pressure thereon, and thus cause its entire circumference to enter within the flange of the can-head, the can-head and can-body being first brought together at an angle to each other. To cause the flange of the can-head (which may be termed the "temporary" or "changeable" half-mold of the machine) to thus act as a half or part mold to size and round the can-body, in conjunction with the other (or permanent and unchangeable) part mold of the machine, I simply provide means for holding the can-head against the pressure necessary to round up the can-body exerted upon it by the opposing part mold as the can-body is clamped or compressed between the flange of the can-head and such opposing part mold. The means or device for thus holding the can-head against the pressure of the opposing part mold may preferably be of a yielding character, as a spring or weight, as the can-head-holding device may thus be adapted to move out of the way of the can automatically and also to press the head home upon the can-body without further mechanism for either of these purposes or functions. By constructing the machine according to my invention so that the flange of each can-head serves temporarily in the machine as a part mold to round up and size the can-body to which it is to be applied in conjunction with the opposing part mold the machine is materially simplified and cheapened in construction.

My invention consists in the novel devices and novel combinations of parts and devices herein shown and described, and more particularly pointed out in the claims.

Figure 2:
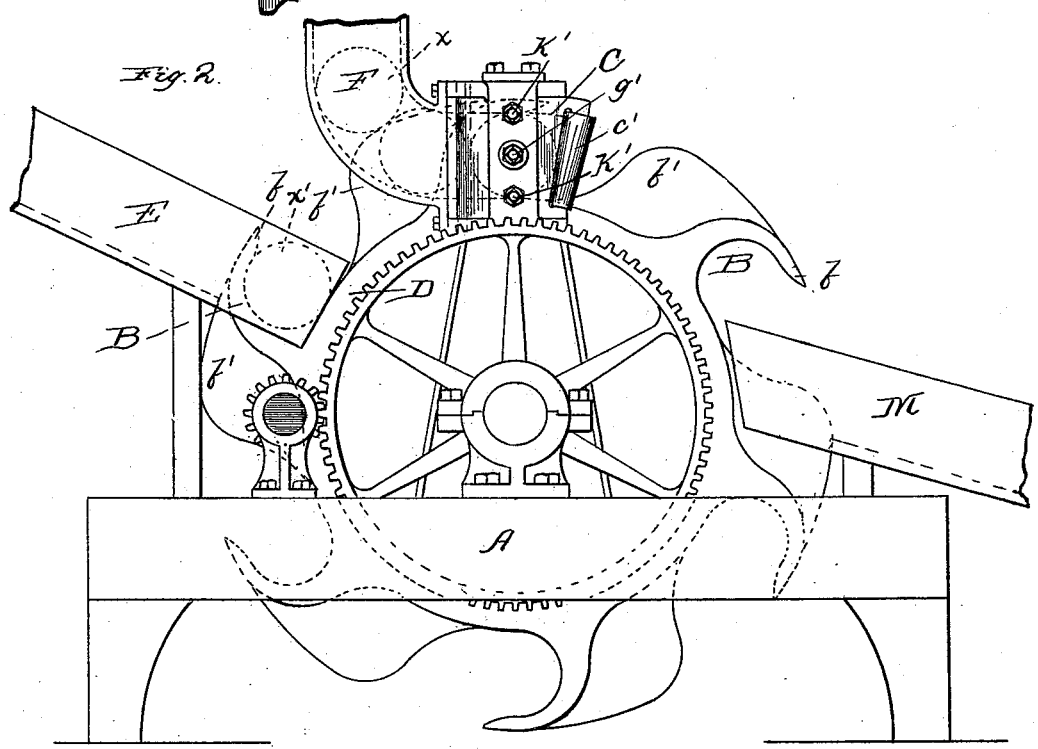

In the accompanying drawings, which form a part of this specification, and in which similar letters of reference indicate like parts, Figure 1 is a plan view of a machine embodying my invention. Fig. 2 is a side elevation. Fig. 3 is a sectional elevation taken on line 3 3 of Fig. 1. Fig. 4 is a vertical longitudinal section taken on line 4 4 of Fig. 1 and looking in the direction indicated by the arrow. Figs. 5 and 6 are both sections on line 5 5 of Fig. 3, the two views showing different stages of the operation. Fig. 7 is a section taken on the broken lines 7 7 of Fig. 3 and looking in the direction of the arrow. Fig. 8 is an enlarged detail plan view illustrating the operation of rounding and sizing the can-body by the external pressure exerted upon it by the half-mold of the machine in conjunction with the opposing half-mold formed by the can-heads and their holding devices. Fig. 9 is a cross-section illustrating the same.

In the drawings, A represents the frame of the machine, which may be of any suitable construction.

B is a half mold or clamp conforming in circumference accurately to the interior circumference of the can-head flange, so that when the can-body is clamped or compressed between this half-mold and the opposing half-flange of the can-head the can-body will be sized and rounded so that its ends will enter the can-head flange without clashing or cutting. To adapt the half-flange B' of each can-head to thus in turn serve temporarily as a part clamp or part mold to size and round up the can-body in conjunction with the half-mold B, I combine with the half-mold B a can-head-holding device C, which causes the can-head to be held against or to resist the pressure of the clamp B with the force necessary to true up and round the can-body by the external pressure thus exerted upon it. When the can-body is thus trued up and rounded to conform to and fit the interior circle of the can-head flange by external pressure thus exerted upon it by the two opposing half-molds B and B', the can head and body are forced together by an endwise pressure or movement in the direction of the axis of the can.

In the machine shown in the drawings a series of the part molds or clamps B are mounted upon a movable carrier D, preferably a continuously-revolving wheel.

E is a passage or chute by or along which the can-bodies are delivered to the part molds or clamps B.

The carrier D is provided with a series of fingers or dividers $b$ and extensions $b'$ for each of the part molds B, so that these fingers and extensions will support the can-bodies in the chute E, and thus operate to automatically take them one by one therefrom.

F F are the can-head-feed passages or chutes, by or along which the can-heads are delivered into position. These feed chutes or passages F are two in number, as ordinarily it is desired to apply both heads to the can-body—one at each end thereof. The can-head-feed chutes or passages F deliver the can-heads to the can-head-holding devices C C. Each of the can-head-holding devices C has a guide $c$, which serves to center the can-head axially in line with the can-body as the latter is carried forward by the half mold or clamp B. The can-head-holding devices C are arranged at an angle to each other, so that the front side of the can-body may enter between the two can-head flanges and engage the rear half of the flange, as is clearly illustrated in Figs. 5 and 8. Each of the can-head-holding devices C is furnished with a shoulder or projection $c'$, preferably made in the form of a friction-roller, to hold the can-head against the pressure of the half-mold B with the necessary force or resistance to true up and round the can-body. Each of the can-head-holding devices C is likewise furnished with a movable latch or device $c^2$ to prevent the can-head from getting out of position before the can-body is brought forward by the carrier. These latches or retaining devices $c^2$ are preferably pivoted to the can-head-holding device C, and I preferably employ one above and one below, as is clearly indicated in Fig. 3. The upper one will be held securely in place by its own gravity, and the lower one may be held in place by a spring $c^3$. As the can-body advances into position it automatically pushes these latches or retaining devices out of the way, so that these latches thus prevent the can-head from tilting, while at the same time they are automatically moved out of the way by the can-body itself as it is carried forward by the half mold or clamp B.

To prevent the flange of the can-head from engaging or clashing with the end of the can-body before the latter is brought to a true circle by the external pressure exerted thereon, I extend the inner side piece C' of the can-head chute, so that its curved end $C^2$ will serve as a guard until the can-body is carried beyond the same, at which time the can-body is brought to a true circle, being at this time firmly compressed between the half-mold B and the opposing temporary half-mold B' of the can-head flange. To cause the can-head-holding device C to serve, also, as the means for pushing the can head and body together after the can-body has been trued up and rounded, I mount the same in the machine so that it may have a slight endwise movement in the direction of the axis of the can-body. This may be most conveniently done by pivoting the holding device at its front edge to the frame and providing it with a spring or yielding support G. The spring G is preferably a coiled spring and fits in a socket $g$ on the frame of the machine and is furnished with an adjusting-screw $g'$. By thus regulating the tension of this spring the can-head may be held with greater or less force by the holding device C or its shoulder $c'$ against the movement of the clamp B, so that any desired amount of external pressure necessary to true up and round the can-body may be exerted upon it. The can-head-holding plates or devices C are held in place against the pressure of the springs G by stops K. Screw-stops K' limit their outward or yielding movement.

M is a discharge-chute into which the headed cans are delivered by the carrier D as it revolves.

The operation is as follows: The can-bodies are placed in the feed-passage E and the can-heads in the feed-passage F, and by their own gravity or by other suitable force they are pushed or rolled down into position, the can-bodies passing or falling one by one into the pockets or half-molds B on the carrier-wheel D, the remaining can-bodies in the feed-chute being supported as the wheel revolves by the finger $b$ and its extension $b'$, with which each of the half-molds is furnished. The can-heads pass down the feed-passage F and rest against the guide $c$ and the shoulder or stop $c'$ of the can-head-holding device C. As the wheel D revolves the can-body $x'$ is carried along until its forward half-circle strikes against the flange B' of the can-head $x$. The can-head at this time is held from moving forward by the holding device C or its projection or roller $c'$, so that the can-body is clamped between the half-flange B' of the can-head on one side and the half-mold B on the opposite side, and is thus by external pressure brought to a true circle, so that the whole circumference of the can-body will enter within the can-head flange. As the half mold or clamp B is carried forward by the continued movement of the wheel B and just as the can-body is brought to a true circle the holding device C begins to yield, and thus allows the can-head to be dragged slightly forward, so that its rear edge will clear the curved end $C^2$ of the can-head-chute plate C', and thus permit the can-head flange to pass onto the now rounded can-body. As the can heads move forward in the can-head-feed passage into place in the holding device C the latch or detaining device $c^2$ prevents the can-head from tilting or getting out of position, and as the can-body advances into position the latches $c^2$ are moved out of the way by contact with the can-body itself. As the wheel D continues to revolve the headed can is carried between the yielding devices C C and delivered into the discharge-chute M, and as the can-head of the now headed can is thus carried forward out of the holding device C the next succeeding can-head in the chute or passage F moves or is pushed forward into position in the holder, so that it will be engaged by the next succeeding can-body and the operation before described repeated in like manner.

I prefer, as in the machine illustrated in the drawings, to mount both the holding devices C C so that they may yield or move and provide each with a yielding support or spring; but it will be readily understood by those skilled in the art that one of the holding devices may be immovable or furnished with no spring-support, all the yield or movement being in such case simply given by the other can-head-holding device. If, for example, as shown in Fig. 5 or 6, one of the springs G should be supposed to be so strong in relation to the other spring G that it would give very little or not at all, the carrier D or movable half-mold B would force the can-body between the holders C C just the same in such case as though both parts were yielding, the one spring which does yield in such case simply yielding to a greater extent.

If it is desired to put only one head upon the can-body—as, for example, the final head—one of the can-head-delivery chutes F may be not used or entirely omitted from the machine. If one of the springs G should be made rigid or non-yielding, it would be obviously immaterial which one should thus be made rigid or omitted from the machine.

The can-head-delivery passage or chute F is furnished at its lower end with a horizontal portion connecting with the can-head-holding device C and extending substantially in the path or direction of the movable half-mold B at the time the latter is coacting with the holding device C to size up and round the can-body and force the head thereon. The half-mold B and the can-body therein thus operate to engage the inner half of the can-head flange, and thereby draw the can-head snugly against the shoulder or roller $c'$, by which the can-head is held against the further forward movement until after the can-body has been first rounded by the external pressure exerted upon it by the half-mold B and the temporary half-mold B'. The can-head passage F also has an upright or inclined portion which serves to cause the can-heads to feed down by their own gravity as each can-head is drawn out of the machine by the movement of the carrier D or the half-molds thereon.

The movable latches or guards $c^2$ on the can-head holder C really may be considered as constituting movable continuations of the can-head-feed passage or chute F or of its inner side piece C'. As these latches or guards project in front of the inner edge of the can-head flange, they would of course prevent the can-head entering upon the can-body were they not made movable, so that they may be first moved out of the way. The forward movement of the carrier D causes the can-body to engage these movable latches $c^2$ and push them back out of the way.

The shoulders or rollers $c'$ on the can-head-holding devices C C are made curved, as indicated in the drawings, so that the continued pressure exerted by the carrier D or movable half-mold B will by its wedging action move these shoulders back sufficiently to permit the headed can to pass out of the machine. These can-head-holding shoulders or rollers $c'$ are preferably made movable by mounting them upon the holder-plates C and mounting these holder-plates so that they may move or yield, as illustrated in the drawings. It will be understood, however, that the only parts which are necessarily yielding or movable are these projecting shoulders or rollers $c'$, as the can-body could pass between the plates C C if they were both stationary and arranged as shown in Fig. 5 but for the rollers or projecting shoulders $c'$. By this construction of can-heading machine it will be observed that the only part of the machine which is driven or to which motion is imparted directly is the carrier-wheel D, and that this movement is a simple continuous revolving one. This very much simplifies the machine both in operation and construction.

I do not herein claim as of my invention the devices shown and described in the patent to Sleeper, No. 412,552, dated October 8, 1889, and wherein the can is headed by mechanism which operates to first flatten the can-body into an oval form and enter the end of the flattened can-body within the flange of the can-head, excepting a very small arc thereof at the upper side of the can-body, and then by external pressure upon this small arc to spring or attempt to spring it within the flange of the can-head.

According to my invention, instead of flattening or pressing in the sides of the can-body I bring it to a true circle, corresponding in size to the interior diameter of the can-head flange, by external pressure upon it of two part molds, which encircle the can-body and between which the can-body is forcibly compressed so as to round and true it up before it is attempted to force the can body and head together. According to the principle of my invention, it will thus be seen that the flange of the can-head and the end of the can-body are not made to intersect each other at all, as shown and described in said Sleeper patent; but the one is made to smoothly telescope concentrically within the other.

I claim—

1. In a can-heading machine, the combination of a mold which partly encircles the can with a can-head holder constructed to hold the can-head in position to complete the mold, whereby the can-body is trued to receive the head between the embrace of a portion of the head-flange and the part mold, substantially as specified.

2. In a can-heading machine, the combination of a mold which presses against the can-body at one side and a can-head holder constructed to hold the flange of the can-head in opposition thereto, and thereby size and round the can-body by external pressure thereon, and thus adapt it for entrance in the can-head, substantially as specified.

3. In a can-heading machine, the combination of a mold which presses against the can-body at one side and a can-head holder constructed to hold the flange of the can-head in opposition thereto, and thereby size and round the can-body by external pressure thereon, and thus adapt it for entrance in the can-head, and means for pressing or forcing the can-head on the body when the latter is thus sized and rounded, substantially as specified.

4. In a can-heading machine, the combination of a mold which presses against the can-body at one side and a can-head holder constructed to hold the flange of the can-head in opposition thereto, and thereby size and round the can-body by external pressure thereon, and thus adapt it for entrance in the can-head, said can-head holder being arranged at an angle to the axis of said mold, substantially as specified.

5. In a can-heading machine, the combination of a mold which presses against the can-body at one side and a pair of can-head holders arranged at an angle to the axis of said mold and constructed each to hold the flange of the can-head in opposition to said mold, and thereby size and round the can-body by external pressure thereon, and thus adapt it to enter the heads, substantially as specified.

6. In a can-heading machine, the combination, with a part mold B, of a can-head-holding device for holding the can-head against or to resist the pressure of said part mold, whereby the half-flange of each can-head is in turn made to serve as a temporary part mold to true up and round the can-body in conjunction with said part mold B, and a chute or passage for delivering the can-heads to said holding device, substantially as specified.

7. In a can-heading machine, the combination, with a part mold B, of a can-head-holding device for holding the can-head against or to resist the pressure of said part mold, whereby the half-flange of each can-head is in turn made to serve as a temporary part mold to true up and round the can-body in conjunction with said part mold B, a chute or passage for delivering the can-bodies to said part mold B, and a chute or passage for delivering the can-heads to said can-head-holding device, substantially as specified.

8. In a can-heading machine, the combination of means for sizing and rounding the can-body, consisting of a movable part mold B, in conjunction with a device for holding the can-head to adapt the half-flange of the can-head to serve as an opposing part mold between which and said part mold B the can-body is externally compressed, with means for forcing the can-head on the body when the latter is thus sized and rounded, and a device for delivering the can-bodies to said part mold, substantially as specified.

9. In a can-heading machine, the combination, with a movable carrier, of a series of molds mounted thereon, each of which presses against the can-body at one side, and a can-head holder constructed to hold the flange of the can-head in opposition thereto, and thereby size and round the can-body by external pressure thereon, and thus adapt it to enter the head, substantially as specified.

10. In a can-heading machine, the combination, with a movable carrier, of a series of molds mounted thereon, each of which presses against the can-body at one side, and a can-head holder constructed to hold the flange of the can-head in opposition thereto, and thereby size and round the can-body by external pressure thereon, and thus adapt it to enter the head, a chute or device for delivering the can-bodies automatically into the molds on said carrier, and a chute for delivering the can-heads to said holder, substantially as set forth.

11. In a can-heading machine, the combination, with a movable carrier, of a series of molds mounted thereon, each of which presses against the can-body at one side, and a can-head holder constructed to hold the flange of the can-head in opposition thereto, and thereby size and round the can-body by external pressure thereon, and thus adapt it to enter the head, a chute or device for delivering the can-bodies automatically into the molds on said carrier, and a chute for delivering the can-heads to said holder, said can-head holder being arranged at an angle to the axis of said molds, substantially as specified.

12. The combination, with a movable half-mold B, of a can-head-holding device C, furnished with a friction-roller c' to engage the can-head, and a yielding support for said can-head-holding device C, substantially as specified.

13. The combination, with a movable half-mold B, of a can-head-holding device C, furnished with a friction-roller c' to engage the can-head, a guide c, and a yielding support for said can-head-holding device, substantially as specified.

14. In a can-heading machine, the combination of a movable mold B, which partly encircles the can with a can-head holder C, arranged at an angle to the axis of said mold and constructed to hold the can-head in position to complete the mold, whereby the can-body is trued to receive the head between the embrace of a portion of the head-flange and the part mold, and a can-head chute F, having a portion adjacent to said can-head holder extending substantially in the path or direction of movement of said movable mold B, substantially as specified.

15. In a can-heading machine, the combination of a movable mold which presses against the can-body at one side, and a can-head holder arranged at an angle to the axis of said mold and constructed to hold the flange of the can-head in opposition thereto, and thereby size and round the can-body by external pressure thereon, and thus adapt it to enter the head, a can-head-delivery chute F, and a guard C² to prevent the rear edge of the can-head flange coming in contact with the end of the can-body before the can-body is trued up and rounded, substantially as specified.

16. The combination, with a movable half-mold B, of a can-head-holding device C, arranged at an angle to the axis of said half-mold and pivoted at one edge thereof, and a spring or yielding support for holding said can-head-holding device in position, substantially as specified.

17. The combination, with a movable half-mold B, of a pair of can-head-holding devices C, arranged at an angle to each other, said can-head-holding devices being pivoted to the frame at their front edges, and yielding supports for said can-head-holding devices, substantially as specified.

18. The combination, with a movable half-mold B, of a pair of can-head-holding devices C, arranged at an angle to each other, said can-head-holding devices being pivoted to the frame at their front edges, and yielding supports for said can-head-holding devices, and each of said can-head-holding devices being furnished with a guide c, substantially as specified.

19. The combination, with a movable half-mold B, of a pair of can-head-holding devices C, arranged at an angle to each other, said can-head-holding devices being pivoted to the frame at their front edges, and yielding supports for said can-head-holding devices, each of said can-head-holding devices being furnished with a guide c and a projection c', substantially as specified.

20. The combination of a revolving carrier-wheel D, having a series of part molds B mounted thereon, the can-body-delivery chute E, guards or extensions b' on said carrier-wheel, and a pair of can-head-holding devices C, furnished with guides c and projections or shoulders c' and arranged at an angle to the axis of said part molds on said wheel, substantially as specified.

21. The combination of a revolving carrier-wheel D, having a series of part molds B mounted thereon, the can-body-delivery chute E, guards or extensions b' on said carrier-wheel, a pair of can-head-holding devices C, furnished with guides c and projections or shoulders c' and arranged at an angle to the axis of said part molds on said wheel, and a pair of can-head-delivery chutes F, substantially as specified.

22. The combination of a revolving carrier-wheel D, having a series of part molds B mounted thereon, the can-body-delivery chute E, guards or extensions b' on said carrier-wheel, a pair of can-head-holding devices C, furnished with guides c and projections or shoulders c' and arranged at an angle to the axis of said part molds on said wheel, and a pair of can-head-delivery chutes F, said can-head chutes having inner side pieces C', furnished with guards C² to prevent the flanges of the can-heads and the end of the can-bodies from clashing before the can-body is rounded, substantially as specified.

23. The combination of a revolving carrier-wheel D, having a series of part molds B mounted thereon, the can-body-delivery chute E, guards or extensions b' on said carrier-wheel, and a pair of can-head-holding devices C, furnished with guides c and projections or shoulders c' and arranged at an angle to the axis of said part molds on said wheel, the projecting shoulders c of said can-head-holding devices being adapted to yield or separate to permit the passage of the headed can between them, substantially as specified.

24. The combination of a revolving carrier-wheel D, having a series of part molds B mounted thereon, the can-body-delivery chute E, guards or extensions b' on said carrier-wheel, and a pair of can-head-holding devices C, furnished with guides c and projections or shoulders c' and arranged at an angle to the axis of said part molds on said wheel, the projecting shoulders c' of said can-head-holding devices being adapted to yield or separate to permit the passage of the headed can between them, together with plates C C, upon which said projecting shoulders are mounted, substantially as specified.

25. The combination of a revolving carrier-wheel D, having a series of part molds B mounted thereon, the can-body-delivery chute E, guards or extensions $b'$ on said carrier-wheel, a pair of can-head-holding devices C, furnished with guides $c$ and projections or shoulders $c'$ and arranged at an angle to the axis of said part molds on said wheel, and a pair of can-head-delivery chutes F, and movable latches or guards $c^2$, substantially as specified.

26. The combination of a revolving carrier-wheel D, having a series of part molds B mounted thereon, the can-body-delivery chute E, guards or extensions $b'$ on said carrier-wheel, a pair of can-head-holding devices C, furnished with guides $c$ and projections or shoulders $c'$ and arranged at an angle to the axis of said part molds on said wheel, and a pair of can-head-delivery chutes F, and a pair of movable latches or guards $c^2$ for each of said can-head-holding devices, one arranged above and one below and adapted to be moved out of the way by the can-body as it is moved into position by the carrier and part molds, substantially as specified.

LEWIS E. CURTIS.

Witnesses:
H. M. MUNDAY,
EMMA HOCK.